(12) United States Patent
Terahata et al.

(10) Patent No.: US 10,514,267 B2
(45) Date of Patent: Dec. 24, 2019

(54) VEHICLE OPERATION MANAGEMENT APPARATUS

(71) Applicant: Toyota Jidosha Kabushiki Kaisha, Toyota-shi, Aichi-ken (JP)

(72) Inventors: Katsuya Terahata, Susono (JP); Naoya Ishizaki, Shizuoka-ken (JP); Yushi Seki, Susono (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 16/225,170

(22) Filed: Dec. 19, 2018

(65) Prior Publication Data

US 2019/0195645 A1 Jun. 27, 2019

(30) Foreign Application Priority Data

Dec. 27, 2017 (JP) .................................. 2017-252353

(51) Int. Cl.
*G01C 21/34* (2006.01)
*G01C 21/36* (2006.01)
(Continued)

(52) U.S. Cl.
CPC ..... *G01C 21/3476* (2013.01); *G01C 21/3469* (2013.01); *G01C 21/3685* (2013.01);
(Continued)

(58) Field of Classification Search
CPC ............ G01C 21/3476; G01C 21/3469; G01C 21/3685; G06Q 10/02; G06Q 50/30; G06Q 2240/00; G08G 1/202
(Continued)

(56) References Cited

U.S. PATENT DOCUMENTS 7,818,190 B1 10/2010 Sutherland
2011/0087429 A1 4/2011 Trum
(Continued)

FOREIGN PATENT DOCUMENTS

CN 103797334 A 5/2014
CN 106064614 A 11/2016
(Continued)

OTHER PUBLICATIONS

Notification of Reasons for Refusal dated Feb. 6, 2018 in Japanese Appln. No. 2017-252353.
(Continued)

*Primary Examiner* — Gertrude Arthur Jeanglaude
(74) *Attorney, Agent, or Firm* — Dinsmore & Shohl LLP (57) ABSTRACT

A vehicle operation management apparatus includes an operation management controller receiving information including embarking and disembarking position information; selecting an overnight stay parking lot; creating the operation plan including a plan of using at least one of electric power and fuel in accordance with a facility of the overnight stay parking lot; selecting the overnight vehicle; calculating a price corresponding to the operation plan; and transmitting information of the selected overnight vehicle and the determined price to the user terminal. Further, the overnight vehicle includes a rechargeable battery, and in a case where there is no facility capable of charging the battery and no: facility capable of performing fuel supply to the overnight vehicle in the overnight stay parking lot selected in the operation plan, travel, control in the operation plan is set to travel control of suppressing consumption of electric power from the battery in the overnight vehicle.

4 Claims, 7 Drawing Sheets (51) Int. Cl.
*G06Q 50/30* (2012.01)
*G08G 1/00* (2006.01)
*G06Q 10/02* (2012.01)

(52) U.S. Cl.
CPC ............. *G06Q 10/02* (2013.01); *G06Q 50/30* (2013.01); *G08G 1/202* (2013.01); *G06Q 2240/00* (2013.01)

(58) Field of Classification Search
USPC ......................................................... 701/410
See application file for complete search history.

(56) References Cited

U.S. PATENT DOCUMENTS

| | | | |
|---|---|---|---|
| 2012/0277940 A1* | 11/2012 | Kumar | ................ B61L 27/0027 701/20 |
| 2013/0066552 A1 | 3/2013 | Hamilton, II et al. | |
| 2015/0161533 A1 | 6/2015 | Kawamoto et al. | |
| 2016/0016484 A1* | 1/2016 | Igarashi | .................. B60L 50/10 701/22 |
| 2016/0304080 A1 | 10/2016 | Sugiyama et al. | |

FOREIGN PATENT DOCUMENTS

| | | |
|---|---|---|
| JP | H06048184 A | 2/1994 |
| JP | 2002-140788 A | 5/2002 |
| JP | 2007248434 A | 9/2007 |
| JP | 2010-257111 A | 11/2010 |
| JP | 2012515325 A | 7/2012 |
| JP | 5104678 B2 | 12/2012 |
| JP | 2014203370 A | 10/2014 |
| JP | 5928588 B2 | 6/2016 |
| JP | 2017196927 A | 11/2017 |

OTHER PUBLICATIONS

Decision to Grant a Patent dated Jun. 19, 2018 in Japanese Appln. No. 2017-252353.

* cited by examiner

PRICE TABLE

| EM-BARKING LOCATION | EM-BARKING TIME | DISEM-BARKING LOCATION | DISEM-BARKING TIME | OVERNIGHT STAY TIMING | OVERNIGHT STAY LOCATION | PRICE |
|---|---|---|---|---|---|---|
| SUBURB | 18:00 | CITY CENTER | 9:00 | BEFORE TRAVEL | SUBURBAN SHOP P | B1 |
| | | | | | SUBURB P | B2 |
| | | | | AFTER TRAVEL | CITY CENTER SHOP P | S1 |
| | | | | | CITY CENTER P | S2 |
| CITY CENTER | 18:00 | SUBURB | 9:00 | BEFORE TRAVEL | CITY CENTER SHOP P | S1 |
| | | | | | CITY CENTER P | S2 |
| | | | | AFTER TRAVEL | SUBURBAN SHOP P | B1 |
| | | | | | SUBURB P | B2 |
| SUBURB | 18:00 | EM-BARKING LOCATION | 9:00 | - | SUBURBAN SHOP P | C1 |
| | | | | | SUBURB P | C2 |
| CITY CENTER | 18:00 | EM-BARKING LOCATION | 9:00 | - | CITY CENTER SHOP P | A1 |
| | | | | | CITY CENTER P | A2 |

VEHICLE OPERATION MANAGEMENT APPARATUS

CROSS-REFERENCE TO RELATED APPLICATION(S)

The present application claims priority to and incorporates by reference the entire contents of Japanese Patent Application No. 2017-252353 filed in Japan on Dec. 27, 2017.

BACKGROUND

The present disclosure relates to a vehicle operation management apparatus.

Japanese Patent No. 5928538 discloses a vehicle operation management apparatus having an operation management means for creating an operation plan of an on-demand vehicle on the basis of requests from a plurality of users and managing operations of the on-demand vehicle in accordance with the created operation plan. The vehicle operation-management apparatus described in Japanese Patent No. 5928588 obtains from the users respective desired embarking positions, desired embarking time zones, desired disembarking positions, and desired disembarking time zones, and determines operation plans that achieve embarking and disembarking of all users in desired time zones on the basis of the information obtained from the users. In addition, the vehicle operation management apparatus described in Japanese Patent No. 5928588 employs a system that varies a price in accordance with the range of a desired time zone of embarking and disembarking.

SUMMARY

There is a need for at least partially solving problems in the related-art technology.

According to an embodiment, a vehicle operation management apparatus, that creates an operation plan based on information transmitted from a user terminal operated by a user and that manages an operation of an overnight vehicle capable of allowing overnight stay in the vehicle, includes an operation management controller to receive information including embarking and disembarking position information from the user terminal operated by the user who embarks on the overnight vehicle; select an overnight stay parking lot based on the received information; create the operation plan including a plan of using at least one of electric power and fuel in accordance with a facility of the overnight stay parking lot; select the overnight vehicle that can be used in accordance with the operation plan; calculate a price corresponding to the operation plan; and transmit vehicle information of the selected overnight vehicle and price information of the determined price to the user terminal. Further, the overnight vehicle includes a rechargeable battery, and in a case where there is no facility capable of charging the battery and no facility capable of performing fuel supply to the overnight vehicle in the overnight stay parking lot selected in the operation plan, travel control in the operation plan is set to travel control of suppressing consumption of electric power from the battery in the overnight vehicle.

According to an embodiment, a vehicle operation management apparatus, that creates an operation plan based on information transmitted from a user terminal operated by a user and that manages an operation of an overnight vehicle capable of allowing overnight stay in the vehicle, includes an operation management controller to: receive information including embarking and disembarking position information from the user terminal operated by the user who embarks on the overnight vehicle; select an overnight stay parking lot based on the received information; create the operation plan including a plan of using at least one of electric power and fuel in accordance with a facility of the overnight stay parking lot; select the overnight vehicle that cars be used in accordance with the operation plan; calculate a price corresponding to the operation plan; and transmit vehicle information of the selected overnight vehicle and price information of the determined price to the user terminal.

Further, the overnight vehicle includes an engine capable of generating electricity, and the operation plan includes a plan of using at least one of electric power or fuel capable of maintaining a state where the engine is not used in a predetermined time zone.

DETAILED DESCRIPTION

In the related-art technology, in a case where an overnight vehicle is used in which a user can stay overnight therein, it is not considered how energy such as electric power or fuel, necessary for the overnight stay, is to be supplied In a parking lot or in an overnight vehicle. Therefore, it has been difficult to execute an optimum operation plan which is created by taking an energy balance into consideration In employing a system for allocating an overnight vehicle in which it is assumed that the user stays overnight in the overnight vehicle. In this case, due to lack or the consideration of the use plan of electric power or fuel, there is a risk of an electric power shortage while using the overnight vehicle.

Hereinafter, an embodiment of the present disclosure will be described with reference to the accompanying drawings. Note that, throughout the drawings of the present disclosure, the same reference signs are used to describe the same or corresponding elements. Furthermore, the present disclosure is not limited to the embodiment described below.

Figure 1:
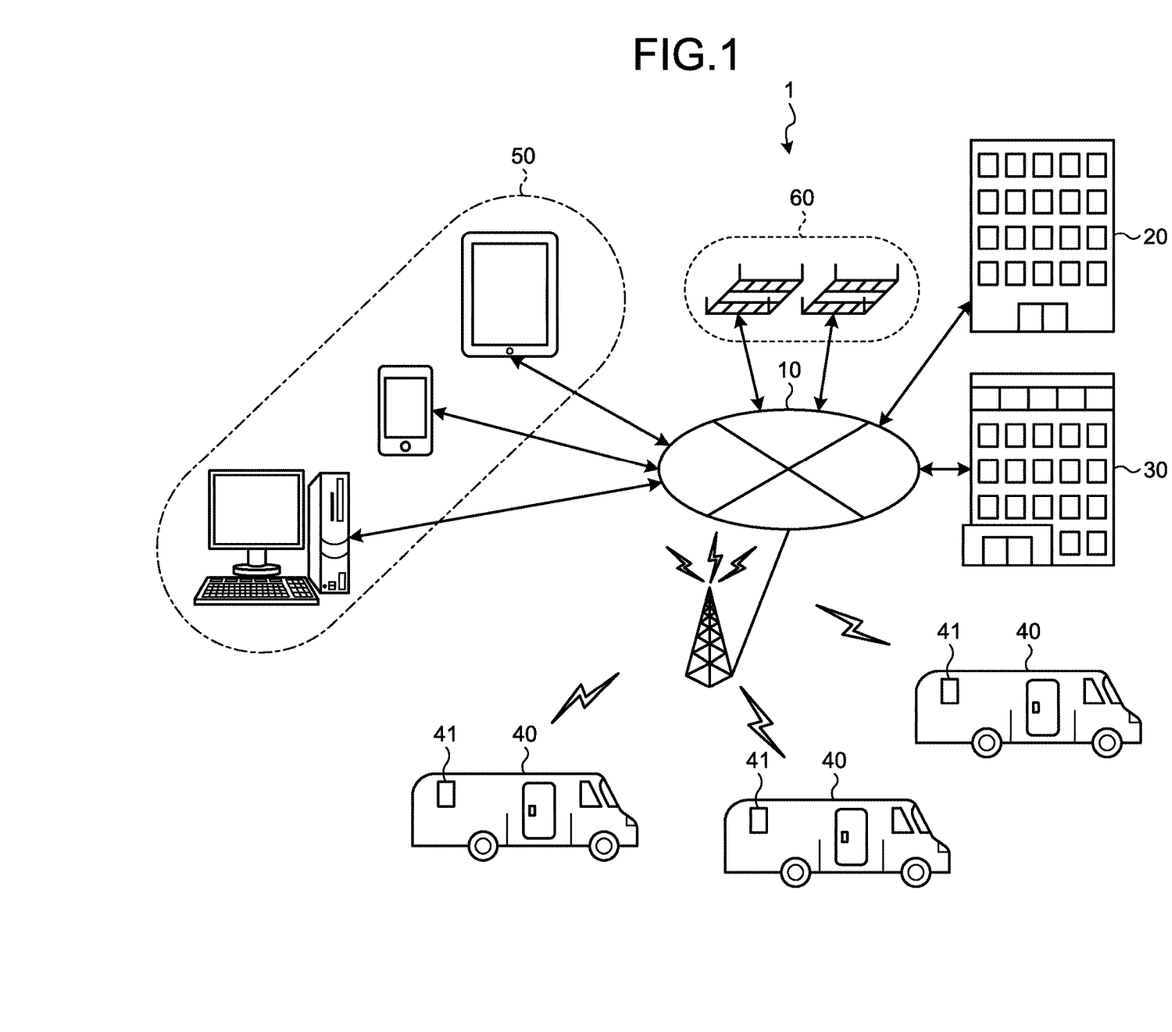
FIG. 1 is a schematic diagram illustrating a vehicle allocation system to which a vehicle operation management apparatus according to an embodiment of the present disclosure can be applied.

First, a vehicle operation management apparatus according to an embodiment of the present disclosure will be described, FIG. 1 is a schematic diagram illustrating a vehicle allocation system 1 to which a vehicle operation management apparatus according to this embodiment can be applied. As illustrated in FIG. 1, the vehicle allocation system 1 according to this embodiment includes a network 10, a vehicle operation management apparatus 20, a parking lot management center 30, a vehicle 40 equipped with a vehicle terminal apparatus 41, and a user terminal apparatus 50. The network 10 includes an Internet channel network and a mobile phone channel network providing mutual communication between the vehicle operation management apparatus 20, the parking lot management center 30, the vehicle 40, and the user terminal apparatus 50. In other words, in the vehicle allocation system 1 according to this embodiment, the vehicle operation management apparatus 20, the parking lot management center 30, the individual vehicles 40, and the user terminal apparatus 50 are communicably connected to each other via the network 10.

Figure 2:
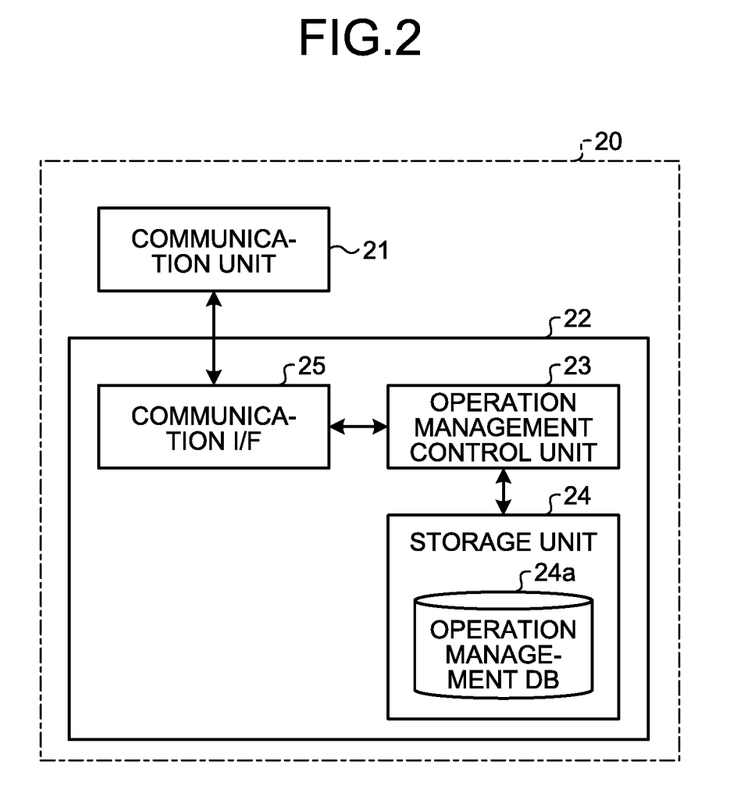
FIG. 2 is a block diagram schematically illustrating an example configuration of the vehicle operation management apparatus of FIG. 1.

The vehicle operation management apparatus 20 creates an operation schedule of the vehicle 40 in accordance with the user's desire (request or demand), and determines an operation plan. Furthermore, the vehicle operation management apparatus 20 supplies operation plan information to the vehicle 40 so as to manage the operation of the vehicle 40. The vehicle operation management apparatus 20 supplies not only the operation plan information but also a variety of information related to the operation of the vehicle 40 to the user. FIG. 2 is a block diagram schematically illustrating an example configuration of the vehicle operation management apparatus 20.

As illustrated in FIG. 2, the vehicle operation management apparatus 20 includes a communication unit 21 and a server 22. The communication unit 21 is connected to the server 22 via a communication line built in the vehicle operation management apparatus 20. The communication unit 21 connects to the network 10 so as to communicate with the parking lot management center 30, the vehicle terminal apparatus 41, and the user terminal apparatus 50.

The communication unit 21 transmits the operation plan information to and receives a vehicle identification information and an operation status information from the vehicle terminal apparatus 41. Note that the vehicle identification information includes an information item to identify the vehicles 40. The operation status information includes an information item indicating the operation status of the vehicle 40 such as a position information and a speed information. The communication unit 21 receives a reservation status information from and transmits a parking reservation information to the parking lot management center 30. The reservation status information includes an information item indicating availability of a parking lot 60. The parking reservation information includes an information item for reserving a parking date arid time and a parking position in the parking lot 60. The communication unit 21 exchanges information with the user terminal apparatus 50, specifically, transmits one or more information items to the user terminal apparatus 50, which is owned by the user, when the user uses the vehicle 40, and receives a user identification information to identify the user and a variety of information from the user terminal apparatus 50.

The server 22 includes an operation management control unit 23, a storage unit 24, and a communication interface (or communication I/F) 25. The operation management control unit 23 includes a microcomputer having a Central Processing Unit (CPU), a Read Only Memory (ROM) and a Random Access Memory (RAM) as a main component thereof. The operation management control unit 23 as an operation management controller comprehensively controls behavior of the vehicle operation management apparatus 20, in particular, the server 22, concerning the determination of the operation plan and an operation management. The storage unit 24 includes a storage medium such as a hard disk and a semiconductor memory, and a drive device to drive these storage media, and stores various programs and various data in a readable and writable manner. The storage unit 24 includes an operation management database 24a in which the user identification information and a variety of information items necessary for the user to use the vehicle 40 (hereinafter may be referred to as user selection information) are stored in an associated manner so as to be retrieved accordingly. The operation management database (or operation management DB) 24a retrievably stores the vehicle identification information and the operation status information associated with each other. The vehicle identification information includes an information item identifying the vehicle 40, the information item being transmittable from the vehicle terminal apparatus 41 mounted on the vehicle 40. The communication interface 25, which is built in the vehicle operation management apparatus 20, refers to an interface for connecting to a network channel such as a local area network channel.

The user identification information and the vehicle identification information are individually stored in the operation management database 24a in a retrievable manner when assigned to the user and the vehicle 40. The user identification information is registered in association with the name and the address of the user, or the position information such as longitude and latitude representing the position of the user or the like. For example, when the user transmits a predetermined information item together with the user identification information by using the user terminal apparatus 50, the user identification information and the predetermined information are stored in association with each other in a retrievable manner in the operation management database 24a of the storage unit 24. Similarly, when the vehicle terminal apparatus 41 transmits predetermined information items such as the position information and the vehicle information together with the vehicle identification information, the vehicle identification information and the predetermined information items are stored in association with each other in a storage position of the operation management database 24a to be retrieved accordingly. The vehicle information includes information items indicating such as a battery charge amount (or State of Charge (SOC)), a remaining amount of fuel (or fuel remaining amount), a current position, and a list of missing items. Note that, however, the vehicle information is not necessarily limited to these information items.

Figure 3:
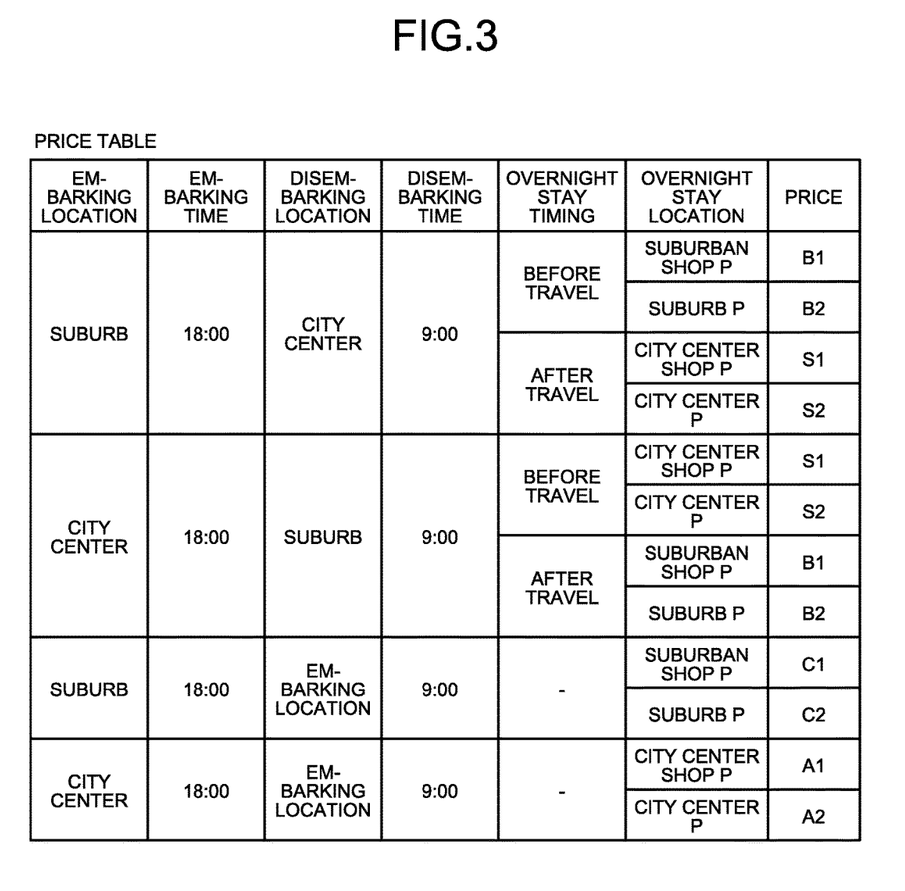
FIG. 3 is a table Illustrating an example of data of a price information stored in an operation management database of the vehicle operation management apparatus.

The operation management database 24a stores data indicating price information. FIG. 3 is a table illustrating an example data of the price information used in this embodiment. As illustrated in FIG. 3, the price information includes information items indicating embarking location, embarking time, disembarking location, disembarking time, overnight stay timing, overnight stay location, and price. Note that the information items of the price information are not limited to the above. For example, the price information may include information items such as embarking date, disembarking date, or a highway used in the operation plan. Details of the price information will be described below.

Figure 4:
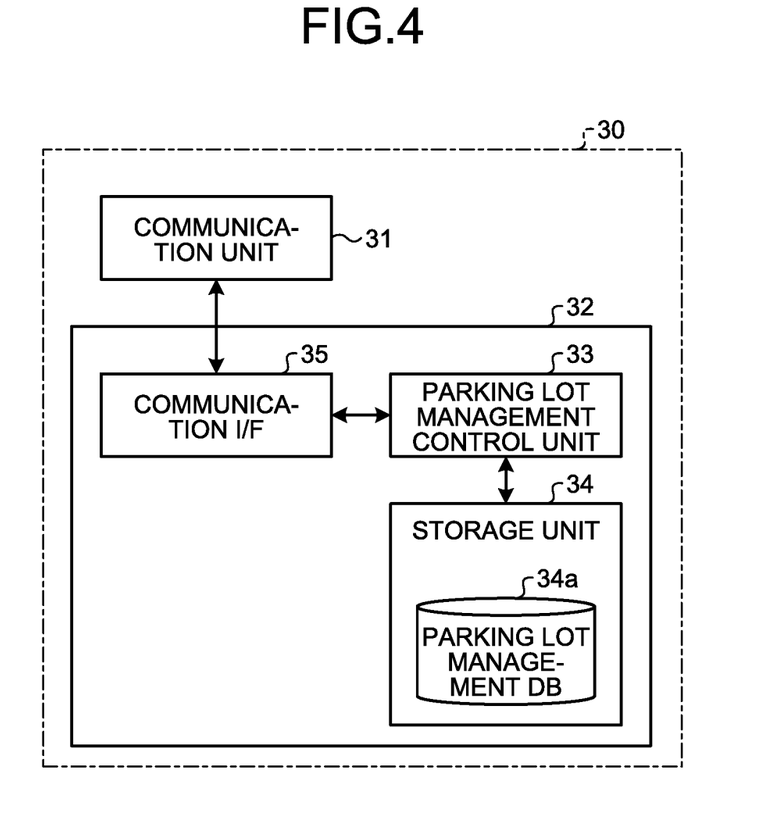
FIG. 4 is a block diagram schematically illustrating an example configuration of a parking lot management center of FIG. 1.

The parking lot management center 30 is capable of retrieving the availability or vacancy status of the parking lot 60 at various locations on the basis of the operation plan of the vehicle 40. The parking lot management center 30 reserves parking for each of parking lots. FIG. 4 is a block diagram schematically illustrating an example configuration of the parking lot management center 30.

As illustrated in FIG. 4, the parking lot management center 30 includes a communication unit 31 and a server 32. The communication unit 31 is connected to the server 32 via a communication line built in the parking lot management center 30. The communication unit 31 communicably connects to the network 10 and mainly provide communications between the vehicle operation management apparatus 20 and a management apparatus at the parking lot 60 at various locations. The communication unit 31 receives availability or vacancy status, that is, the communication unit 31 receives reservation status information for each of dates and times of the parking lot 60 from and transmits parking reservation information needed for reserving the use date, use time, use period or the like, of the parking lot 60 to the management apparatus of the parking lot 60.

The server 32 includes a parking lot management control unit 33, a storage unit 34, and a communication interface (or communication I/F) 35. The parking lot management control unit 33 includes a microcomputer having a CPU, a ROM, and a RAM as a main component. The parking lot management control unit 33 comprehensively controls the behavior of the parking lot management center 30, in particular, the server 32, which manages reservation status information and parking reservation information of the parking lot 60. The storage unit 34 includes a storage medium such as a hard disk and a semiconductor memory, and a drive device for these storage media and writably and readably stores various programs and various data.

The storage unit 34 includes a parking lot management database (or parking lot management DB) 34a. The parking lot management database 34a retrievably stores reservation status information of the parking lot 60 or the like in association with parking lot identification information. The parking lot identification information includes an information item to 20 identify the parking lot 60, transmitted from a management apparatus (not illustrated) of the parking lot 60 at various locations. Furthermore, the parking lot identification information is registered in association with position information such as longitude and latitude information and the name of the parking lot 60. When the management apparatus of the parking lot 60 transmits the parking lot information to the parking lot management center 30, the parking lot management database 34a retrievably stores the parking lot identification information and the parking lot information in association with each other. The communication interface 35, which is built in the parking lot management center 30, is an interface for connecting to a network channel such as a Local Area Network (LAN) line channel.

Parking lot information is transmitted to the parking lot management center 30 at any time from the management apparatus of each of the parking lots 60. The parking lot information includes at least position information thereof, charging facility information thereof as an information item indicating the presence or absence of the charging facility, and fueling facility information thereof as an information item indicating the presence or absence of a fueling facility 20 to supply fuel. For example, the parking lot information includes, when necessary, reservation status information and parking status information, which are related to parking of the vehicle 40 and other vehicles. The parking lot information may include other Information Items such as parking lot name information and price information.

Figure 5:
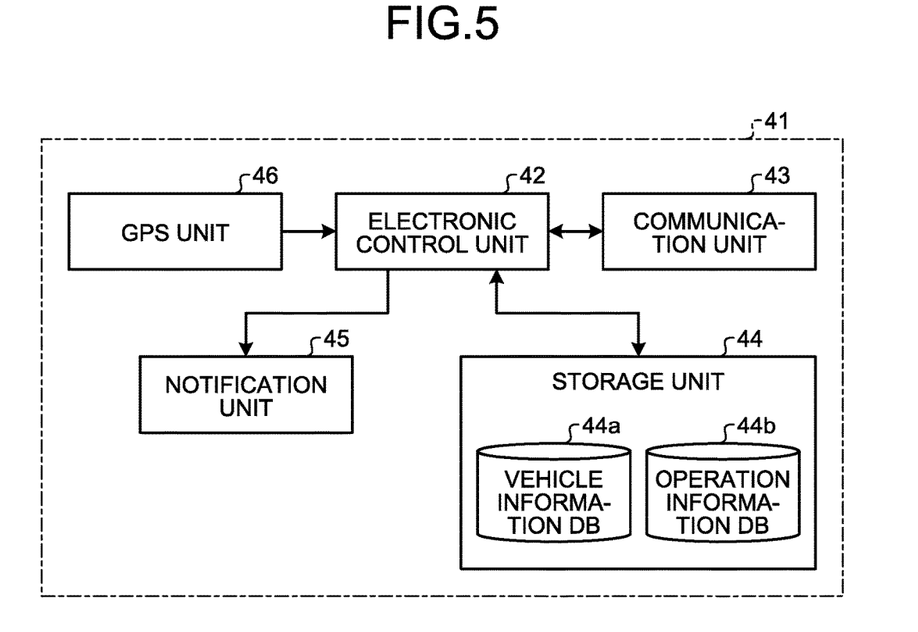
FIG. 5 is a block diagram schematically illustrating an example configuration of a vehicle terminal apparatus mounted in the vehicle of FIG. 1.

The vehicle 40 herein refers to an overnight vehicle such as a camper equipped with facilities needed for overnight stay In the vehicle. The vehicle 40 includes known facilities necessary for traveling. Specifically, the vehicle 40 includes an engine as a drive source, and the engine is driven by combustion of fuel and is capable of generating electric power by using an electric motor or the like. The generated electric power is charged in a rechargeable battery. Moreover, the vehicle 40 includes a drive transmission mechanism that transmits the driving force of the engine and driving wheels for traveling. The vehicle 40 is an overnight vehicle that travels in accordance with an operation plan appropriately determined by the vehicle operation management apparatus 20 on the basis of a user's request or instructions with no previous plans of operation route and operation hours (hereinafter referred to as am operation plan). For this reason, the vehicle 40 includes the vehicle terminal apparatus 41 capable of transmitting and receiving a variety of information including the operation plan information using communications with the vehicle operation management apparatus 20. FIG. 5 is a block diagram schematically illustrating an example configuration of the vehicle terminal apparatus 41 mounted on the vehicle 40.

As illustrated in FIG. 5, the vehicle terminal apparatus 41 includes an electronic control unit 42, a communication unit 43, a storage unit 44, a notification unit 45, and a Global Positioning System (GPS) unit 46.

The electronic control unit 42 includes a microcomputer having a CPU, a ROM, and a RAM as a main component. The electronic control unit 42 comprehensively controls behavior of the vehicle terminal apparatus 41 mounted on the vehicle 40. The communication unit 43 communicates with the vehicle operation management apparatus 20 by using radio communication via the network 10. The storage unit 44 includes a storage medium such as a hard disk and a semiconductor memory and a drive device for these storage media. The storage unit 44 stores an Operating System (OS) and various application programs necessary for the electronic control unit 42 to comprehensively control the operation of the vehicle terminal apparatus 41. The storage unit 44 includes a vehicle information database (or vehicle information DB) 44a and an operation information database (or operation information DB) 44b. The vehicle information database 44a updatably stores a variety of information items including the battery charge amount, the fuel remaining amount, the current position, and a list of missing items. The operation information database 44b updatably stores various data including the operation plan information supplied from the vehicle operation management apparatus 20. The notification unit 45 includes a display, a speaker or the like. Under the control of the electronic control unit 42, the notification unit 45 displays characters, figures or the like on a screen of the display and outputs sound from a speaker to notify the operation plan information to the outside. The GPS unit 46 receives a radio wave from a GPS satellite and detects the position of the vehicle 40 on which the vehicle terminal apparatus 41 is mounted. The detected position is retrievably stored in the vehicle information database 44 a as the position information in the vehicle information.

Figure 6:
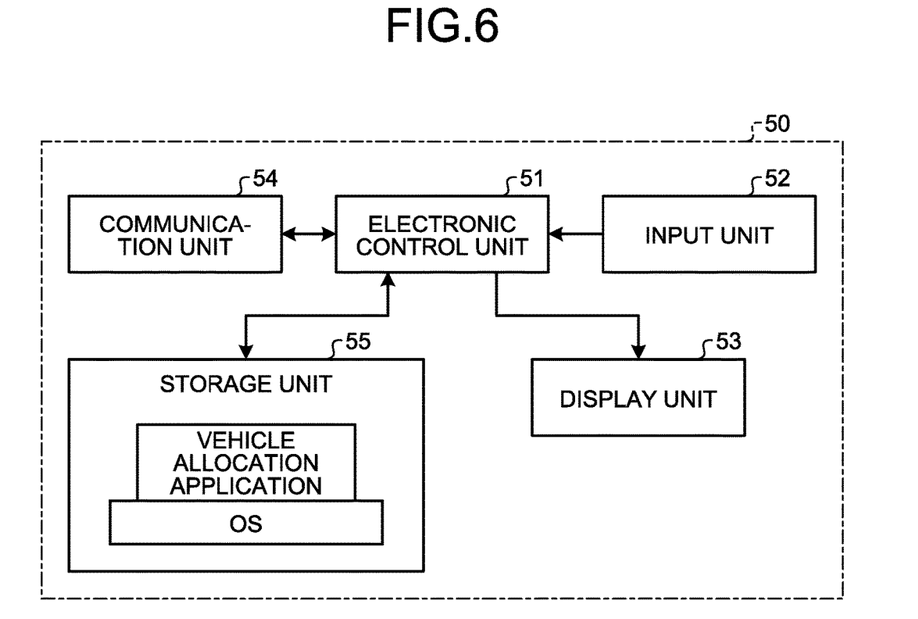
FIG. 6 is a block diagram schematically illustrating an example configuration of a user terminal apparatus of FIG. 1.

The user terminal apparatus 50 as a user terminal is operated by the user. The user terminal apparatus 50 transmits a variety of information such as user information including the user identification information and the user selection information to the vehicle operation management apparatus 20 over vocal communications using various data and sound by using, for example, a communication application. The user identification information includes information items such as a user ID and a password needed to access the vehicle operation management apparatus 20 at the time of transmitting the user information. The user terminal apparatus 50 is capable of receiving a variety of information items such as the operation plan information, an allocation approval signal, and electronic key data from the vehicle operation management apparatus 20. FIG. 6 is a block diagram schematically illustrating an example configuration of the user terminal apparatus 50 of FIG. 1.

As Illustrated in FIG. 6, the user terminal apparatus 50 includes an electronic control unit 51, an input unit 52, a display unit 53, a communication unit 54, and a storage unit 55, which are communicably connected to each other. The electronic control unit 51 includes a microcomputer having a CPU, a ROM, a RAM or the like as a main component. The electronic control unit 51 executes various application programs to comprehensively control the behavior of the input unit 52, the display unit 53, the communication unit 54, and the storage unit 55.

The input unit 52 includes, for example, a keyboard or a touch panel keyboard incorporated in the display unit 53 to detect touch operation on the display panel, or a voice input device enabling vocal communication with the outside. Here, the vocal communication with the outside is specifically the vocal communication with an operator or an artificial intelligence system, for example, resident in the vehicle operation management apparatus 20. The display unit 53 includes, for example, an organic EL panel, a liquid crystal display panel or the like, and displays characters, figures or the like on the display panel to notify information to the outside.

The communication unit 54 connects to the network 10 and implements a function of transmitting and receiving a variety of information such as the user identification information, the user selection information, the operation plan information, and audio data to and from the vehicle operation management apparatus 20. The storage unit 55 stores an Operating System (OS), various application programs including a vehicle allocation application program (hereinafter referred to as a vehicle allocation application), and various data, needed for the electronic control unit 51 to comprehensively control the behavior of the user terminal apparatus 50. The storage unit 55 is capable of storing the user identification information.

As the above-described user terminal apparatus 50, it is possible to adopt, specifically, a mobile phone such as a smartphone, an information terminal such as a tablet terminal, and a personal computer. Note that a desktop personal computer installed at home or the like, a fixed telephone installed at home of the like may also be used.

Figure 7:
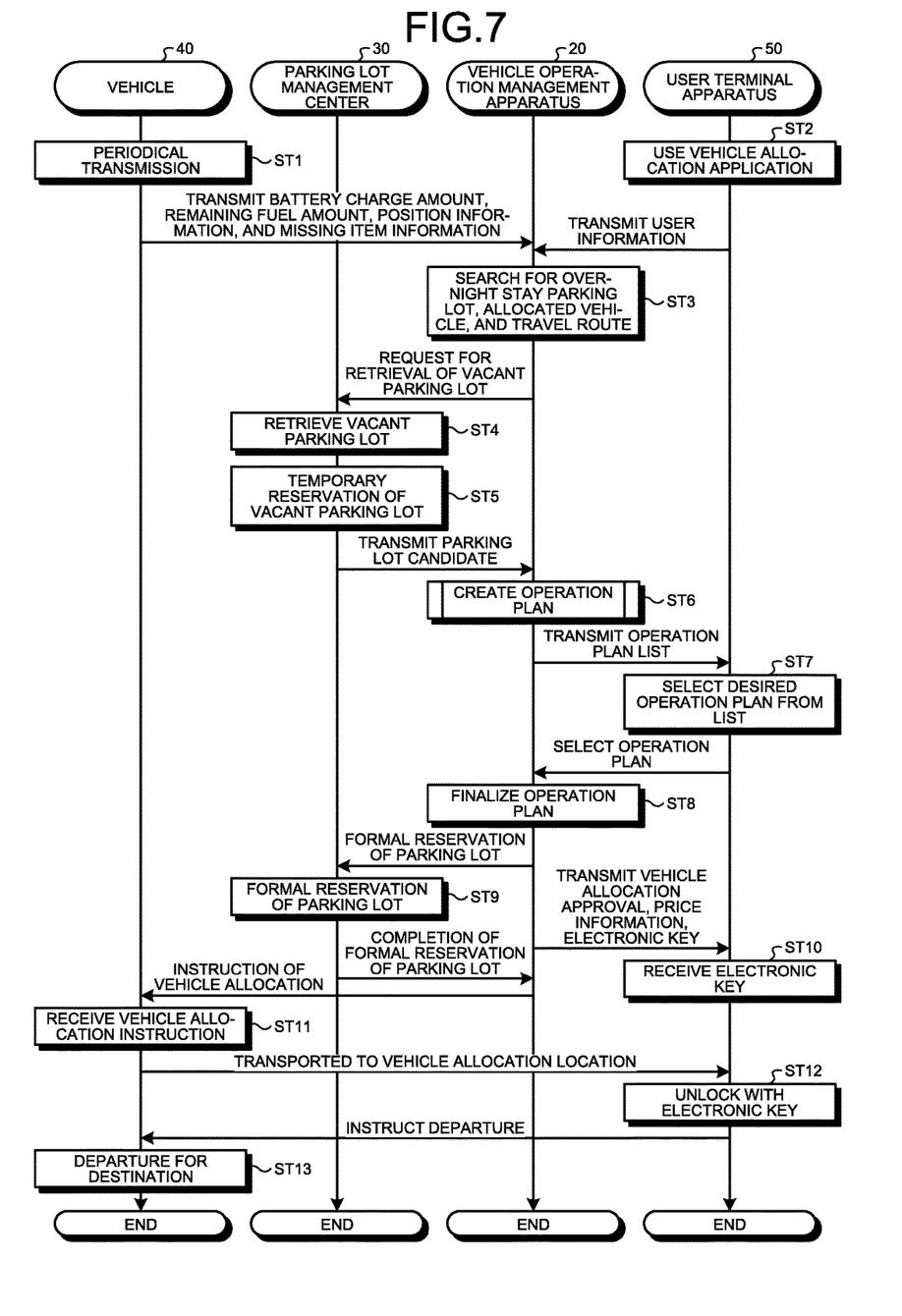
FIG. 7 is a flowchart illustrating a processing method performed by a vehicle allocation system.

Next, a vehicle allocation processing method is described, which includes a creation of the operation plan according to an embodiment of the present disclosure by using the vehicle allocation system 1 having the configuration described above. FIG. 7 is a flowchart illustrating a processing method executed by the vehicle allocation system 1.

As illustrated in FIG. 7, first, in step ST1, a variety of information related to the vehicle 40 is periodically transmitted from each of the plurality of vehicles 40 to the vehicle operation management apparatus 20. Here, the term "periodically" represents execution at every predetermined time such as every one hour or every three hours. Note that while transmission and reception of information is actually performed via the network 10 in the following description, the individual descriptions of such transmission and reception will be omitted. The operation management control unit 23 of the vehicle operation management apparatus 20 stores the vehicle information, received via the communication unit 21 and the communication interface 25 in the storage unit 24, in association with the vehicle identification information related to each of the vehicles 40.

Meanwhile, in step ST2, a vehicle allocation application is activated on the user terminal apparatus 50 by the user's operation on the user terminal apparatus 50. Note that step ST2 is executed independently of step ST1. The vehicle allocation application is activated and executed on the basis of an operation program such as an Operating System (OS) stored in the user terminal apparatus 50. The user terminal apparatus 50 executing the vehicle allocation application transmits the user identification information input by the user or stored in the user terminal apparatus 50 to the vehicle operation, management apparatus 20. In the following, the transmission and reception of a variety of information as well as the storage of information in the storage unit 55 etc. at the use of the vehicle allocation system 1 are appropriately executed on the user terminal apparatus 50 by using the vehicle allocation application.

The user terminal apparatus 50 transmits the user selection information, input by the user on the user terminal apparatus 50, together with the user identification information to the vehicle operation management apparatus 20 as user information. Note that the user selection information herein refers to the Information, that the user desires, including necessary information selected from information items, which are embarking position information including the embarking location; disembarking position information including the disembarking location; embarking and disembarking position information including the embarking position information and the disembarking position information; embarking time information including the embarking time; disembarking time information including the disembarking time, and overnight stay timing information including the overnight stay timing. In addition, the overnight stay timing herein refers to a timing of performing an overnight stay, selected from the timings of either staying at the parking lot 60 closer to the embarking location or staying at the parking lot 60 closer to the disembarking location at the time of travel from the embarking location to the disembarking location, the embarking location and the disembark location being desired by the user. The overnight stay timing of staying closer to the embarking location is defined as a timing before travel to the disembarking position, and the overnight stay timing of staying closer to the disembarking location is defined as a timing after travel to the disembarking position. The overnight stay timing information includes the timing either before or after travel to the disembarking position which is selected by the user. The operation management control unit 23 of the vehicle operation management apparatus 20 stores the user selection information received via the communication unit 21 and the communication interface 25 in the storage unit 24 in association with the corresponding user identification information.

Thereafter, in step ST3, the vehicle operation management apparatus 20 searches for the vehicle 40 to be allocated to the user, the parking lot 60 for the overnight stay (also referred to as an overnight stay parking lot 60), and the travel route on the basis of the received vehicle information and user information. Here, the overnight stay parking lot herein refers to a parking lot 60 at which the user or the like stays overnight inside the vehicle, that is, the retrieved searched-for) vehicle 40. The vehicle 40 to be allocated herein refers to the vehicle 40 that is transported to achieve a state where the user can embark for preparation for the embarkment of the user, and that is selected from among the individual vehicles 40. The travel route herein refers to a travel path on a road that allows traveling selected in accordance with the purpose-specific travel patterns in the travel of the vehicle 40 on the basis of the user selection information transmitted from the user terminal apparatus 50. The operation management control unit 23 searches for a time zone during which the vehicle 40 is to be parked in the overnight stay parking lot 60 on the basis of the searched-for travel route. The vehicle operation management apparatus 20 transmits a retrieval request signal, which is to search for an overnight stay parking lot that is available in the time zone (hereinafter referred to as a vacant parking lot) existing along the searched-for travel route, to the parking lot management center 30.

After step ST3, the retrieval request signal to search for the vacant parking lot is transmitted from the vehicle operation management apparatus 20 to the parking lot management center 30. In response to this, the parking lot management control unit 33 of the parking lot management center 30 retrieves, in step ST4, a vacant parking lot present along the travel route on the basis of the retrieval request signal to search for the vacant parking lot received from the vehicle operation management apparatus 20 and the time zone of parking of the vehicle 40. Note that the parking lot management center 30 stores the received parking lot information in association with the parking lot identification information in each of the parking lots 60 in the parking lot management database 34a of the storage unit 34 at any time.

Subsequently, in step ST5, the parking lot management center 30 transmits the parking reservation information to the vacant parking lot, and makes a temporary reservation for the retrieved vacant parking lot, so as to temporarily inhibit other vehicles from reserving the parking lot at a time point and during the time zone at which the vehicle 40 is to be parked in the parking lot on the basis of the travel route of the vehicle 40. Here, the parking reservation information includes, for example, parking start time at which parking of the vehicle 40 starts in the parking lot 60, parking end time of departure from the parking lot, and parking position information for selecting a location to park within the parking lot 60. Note that the parking reservation information may also include other information. The parking lot management center 30 transmits listed information of the plurality of vacant parking lots temporarily reserved as described above (hereinafter referred to as parking lot candidates) to the vehicle operation management apparatus 20.

Figure 8:
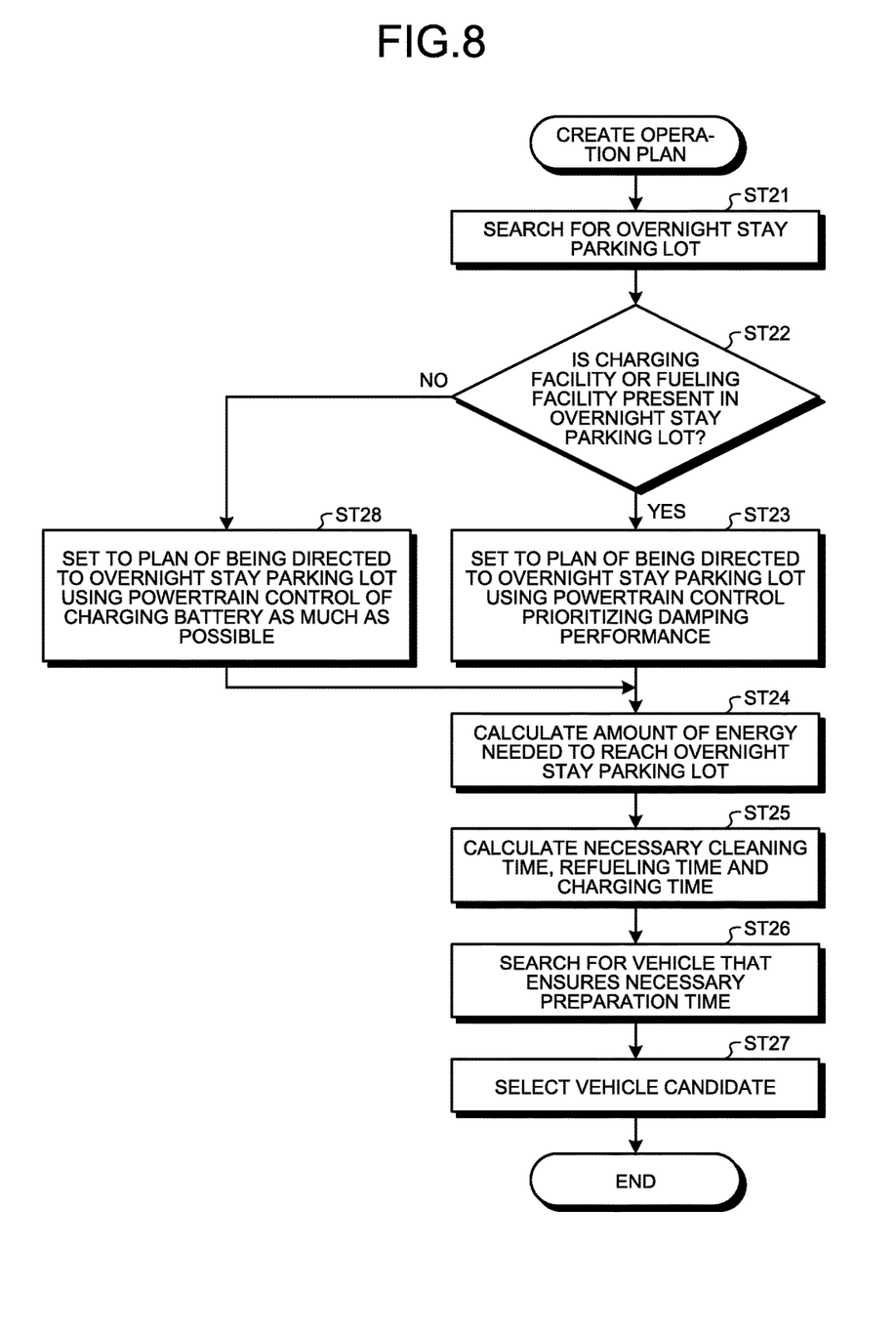
FIG. 8 is a flowchart Illustrating a method of creating an operation plan of FIG. 7.

Thereafter, in step ST6, the vehicle operation management apparatus 20 creates a plurality of operation plans. Here, a specific example of the method of creating an operation plan will be described. FIG. 8 is a flowchart illustrating a method of creating the operation plan of FIG. 7.

As illustrated in FIG. 8, the method of creating an operation plan according to this embodiment starts in step ST21 at which the operation management control unit 23 searches for the parking lot information of the overnight stay parking lot 60 from the operation management database 24a of the: storage unit 24 on the basis of the listed information of parking lot candidates received from the parking lot management center 30. As described above, the parking lot information includes a variety of information items such as the position information, the charging facility information, the fueling facility information, the reservation status information, and the parking status information at least in each of the parking lots 60.

Next, a process goes to step ST22, at which the operation management control unit 23 determines whether at least one of the charging facility and the fueling facility exists in the overnight stay parking lot 60 on the basis of the parking lot information of the searched overnight stay parking lot 60. In a case where the operation management control unit 23 determines that either the charging facility or the fueling facility exists in the searched overnight stay parking lot 60, the process goes to step ST23.

In step ST23, the operation management control unit 23 sets to perform powertrain control, in which vibration control (damping performance) is prioritized in the vehicle 40, on the basis of the travel route searched In the above-described step ST3. By doing this, the operation management control unit 23 prepares a plurality of operation plans that ensures vibration control as much as possible in the vehicle 40.

Thereafter, process goes to step ST24. In step ST24, the operation management control unit 23 calculates the amount of energy needed from the departure position to the overnight stay parking lot on the basis of the plurality of operation plans in which the powertrain control prioritizing the vibration control is to be performed. Thereafter, process goes to step ST25, in which the operation management control unit 23 calculates necessary cleaning time, refueling time, and charging time (hereinafter collectively referred to as necessary preparation time) for each of the vehicles 40 on the basis of the vehicle information received from each of the vehicles 40 in the above-described step ST1. The calculated necessary preparation time for each of the vehicles 40 is stored in the operation management database 24a.

Thereafter, process goes to step ST26. In step ST26, the operation management control unit 23 searches for the vehicle 40 that can ensure the calculated necessary preparation time on the basis of the received vehicle information. Thereafter, in step ST27, the operation management control unit 23 selects at least one vehicle 40 as a candidate of the vehicle 40 which can be used by the user from among the searched-for vehicles 40. The operation management control unit 23 inserts the information of the candidate of the vehicle 40 into the operation plan information.

Meanwhile, in step ST22, in a case where the operation management control unit 23 determines that neither the charging facility nor the fueling facility exists in the searched overnight stay parking lot, the process goes to step ST28. In step ST28, the operation management control unit 23 sets the planning of performing powertrain control, in which the battery is charged as much as possible in the vehicle 40 and the reduction in the battery charge amount is suppressed, on the basis of the travel route searched for in the above-described step ST3. The operation management control unit 23 prepares a plurality of operation plans in which the battery of the vehicle 40 can be charged as much as possible. In the operation plan in this case, at least one of electric power or fuel can he used while maintaining a state in which the engine of the vehicle 40 is not used during a preset time zone such as a sleeping time zone. In other words, the operation management control unit 23 prepares an operation plan in which the battery charge amount in the battery of the vehicle 40 does not become zero at the set time during the parking in the overnight stay parking lot 60.

Thereafter, the process goes to step ST24, in which the operation management control unit 23 calculates the amount of energy necessary from the departure position to the overnight stay parking lot on the basis of the plurality of operation plans set to perform the powertrain control in which the battery can be charged as much as possible. Thereafter, process from steps ST25 to ST27 are similar to the process which is described above. The operation plan list which refers to the plurality of operation plans prepared as described above is transmitted to the user terminal apparatus 50 after step ST6 of FIG. 7. Along with this, the vehicle operation management apparatus 20 transmits the price information corresponding to each of the plurality of operation plans In the operation plan list to the user terminal apparatus 50.

Subsequently, in step ST7, the user selects a desired operation plan from the plurality of operation plans (list) on the user terminal apparatus 50. Here, the price information corresponding to the operation plan is also transmitted to the user terminal apparatus 50. One example of the price information is described in FIG. 3.

Here, the price information will be described. In the example of the price information of FIG. 3, eight price levels S1, S2, A1, A2, B1, B2, C1, and C2 are set as the prices. For example, this price level can be set to have a relationship S1>S2>A1>A2>B1>32>C1>C2. A specific example is described below. In a case where the embarking location is in a suburb and the disembarking location is in a city center, if the parking price when the vehicle 40 is parked at the parking lot 60 in the suburb is less expensive than the parking price when the vehicle 40 is parked in the parking lot 60 in a city center, setting the overnight stay timing to the point before traveling and staying overnight in the vehicle 40 at the suburban parking lot 60 would be a less expensive setting. Furthermore, regarding the parking lot 60 for parking the vehicle 40 at staying overnight in the suburbs or the like, there may be a ease where a parking lot such as meter parking ("SUBURB P" in FIG. 3) is less expensive in the parking price than a parking lot of a shop or the like ("SUBURBAN SHOP P" in FIG. 3). Accordingly, it is possible to set the price corresponding to the parking price depending on which, of the parking lots 60 having different parking prices is to be selected as the overnight stay parking lot. Note that the "SHOP P" herein refers to a parking lot of a commercial facility such as a hot spring facility, a supermarket, a shopping mall, an amusement park, a cartoon café, a movie theater, a club, and a gas station. In addition, in a case where the "SHOP P" is selected as the parking lot 60 to be used at the time of, for example, overnight stay, it is also possible to collect a referral fee or the like from, the commercial facility of the "SHOP P". Moreover, the price setting may be changed depending on the day of the week. Specifically, for example, the price when the embarking date or the disembarking date is a holiday may be set higher than the price when the embarking date and the disembarking date are weekday.

After step ST7, the operation plan information selected by the user is transmitted, from the user terminal apparatus 50 to the vehicle operation management apparatus 20 together with the user identification information. Thereafter, in step ST8, the vehicle operation management apparatus 20 performs a process of finalizing the operation plan on the basis of the received user identification information and the selected operation plan information. The finalized operation plan, information is stored in the operation management database 24a in association with the user identification information.

The vehicle operation management apparatus 20 transmits a reservation information to the parking lot management center 30, the reservation information including an information item indicating finalized reservation to ensure the status that permits the vehicle 40 of the user to be parked at a parking lot in a predetermined time point and time zone based on the operation plan on the basis of the parking lot information included in the operation plan selected by the user. By doing this, the parking lot management center 30 makes the finalized reservation in step ST9 so that any other vehicle cannot make a reservation at the time point and the time zone of parking at the parking lot on the basis of the operation plan of the vehicle 40. The reservation information is stored in the parking lot management database 34a in association with the vehicle identification information of the vehicle 40. Furthermore, the parking lot management center 30 switches each of the remaining temporarily reserved parking lot described above to a vacant parking lot where parking by any other vehicles is possible in the date and time and the time zone which were temporarily reserved. The parking lot management center 30 transmits a signal indicating completion of finalized reservation of the parking lot to the vehicle operation management apparatus 20.

After the operation plan is finalized, the vehicle operation management apparatus 20 transmits a vehicle allocation approval signal, which indicates approvals of the allocation of the vehicle 40 selected by the user, the price information, and a data of an electronic key, to the user terminal apparatus 50. In step ST10, the user terminal apparatus 50 receives the data of the electronic key. Here, the electronic key functions as an unlock key which is used when a user drives or uses the vehicle 40 by using a communication method such as Bluetooth (Registered Trademark), Near Field Communication (NFC) or the like used in the user terminal apparatus 50.

Furthermore, after receiving the signal indicating completion of finalized reservation of the parking lot 60, the vehicle operation management apparatus 20 transmits a signal instructing vehicle allocation to the vehicle 40 selected by the user. In step ST11, the vehicle 40 receives the information indicating the instruction of the vehicle allocation. Thereafter, a predetermined worker or the like moves the vehicle 40 to the location based on the vehicle allocation, that is, the embarking location of the user. Thereafter, in step. ST12, the user unlocks the allocated vehicle 40 by using the data of the electronic key with the user terminal apparatus 50 and gives an instruction of the departure to the vehicle 40. Thereafter, in step ST13, the user embarks on the vehicle 40 and starts for the disembarking location, which is the destination, in accordance with the operation plan information created in step ST6.

With the configuration above, the vehicle 40 can be allocated and moved by using the vehicle allocation system 1. Thereafter, the vehicle is directed to the overnight stay parking lot in accordance with either the powertrain control for charging the battery as much as possible or the powertrain control prioritizing the vibration control in the operation plan from the embarking location to the disembarking location.

According to the embodiment of the present disclosure described above, it is possible to create, as the operation plan created by the vehicle operation management apparatus 20, the plan including planning of the consumption of electric power in the battery of the vehicle 40, the consumption of fuel in the engine of the vehicle 40 in accordance with the facility of the parking lot 60 used for parking at the time of, for example, overnight stay. Accordingly, it is possible to reduce the probability of encountering a power shortage of the battery of the vehicle 40 during overnight stay of the user in the vehicle 40.

Although the embodiment of the present disclosure has been specifically described above, the present disclosure is not limited to the above-described embodiment and it is possible to achieve various modifications based on the technical concept of the present disclosure. For example, the components and the configurations described in the above embodiment are merely examples, and it may also be possible to use any other configurations different from these when necessary or applicable.

For example, the information items exchanged between the vehicle operation management apparatus 20, the parking lot management center 30, the individual vehicles 40, and the individual user terminal apparatuses 50 according to the above-described embodiment are not necessarily limited to the information items as described above, and it may be possible to use any other information items different from the above description when necessary or applicable.

For example, the vehicle 40 described in the above embodiment may be any of various overnight stay vehicles as long as it allows overnight stay in the vehicle, including an overnight vehicle that can be automatically operated, an overnight vehicle driven by another driver, an overnight bus, or a large-sized vehicle that allows overnight stay in the vehicle. Furthermore, the vehicle 40 may be any of vehicles including a hybrid vehicle having both an engine and a motor, a related-art vehicle having an engine but not having a motor, or an Electric Vehicle (EV) having a motor but not having an engine.

Moreover, the processing order of the vehicle allocation processing method performed by the vehicle allocation system 1 according to the above-described embodiment is not limited to the above-described order, and it is possible to change, the order of the steps within a range where the vehicle allocation processing method can be executed. For example, the transmission of the vehicle allocation approval signal, the price information, and the electronic key data may be performed after the completion of the finalized reservation of the overnight stay parking lot 60.

Moreover, although, in the above-described embodiment, an example is described of creating a plan for consumption of electric power in the battery of the vehicle 40 and consumption of fuel in the engine of the vehicle 40 corresponding to the facility of the parking lot 60 used for the parking at the time of, for example, overnight stay, the present disclosure is not necessarily limited to the application at the time of overnight stay. Specifically, the present disclosure may be similarly applied to a case where an overnight vehicle stops at a predetermined parking lot and a driver or a fellow passenger performs other operation or the like. Furthermore, the time zone during which the vehicle 40 is parked is not necessarily restricted to nighttime, and the present disclosure may also be applied when the time sons of parking is daytime.

According to an embodiment, in a case where there is no charging facility capable of charging the battery in the overnight stay parking lot, by performing a travel control of suppressing reduction of the state of charge (SOC) as compared with the case where the charging facility is present, it becomes possible to facilitate acquisition of the amount of electric power available to the users while using the overnight vehicle.

According to an embodiment, in a case where, for example, the sleeping time zone is set as the preset time zone, the engine operation can be inhibited during sleeping time to prevent a situation where the user staying in the overnight vehicle suffers from vibration or noise.

According to an embodiment, since the price setting can be changed depending on whether to perform overnight stay before the travel or to perform overnight stay after the travel, it is possible to provide an operation plan that suits the user's preference.

According to the vehicle operation management apparatus of the present disclosure, it is possible to create a use plan of at least one of electric power and fuel in accordance with a facility of a parking lot used for an overnight stay or the like, thereby enabling preventing an electric power shortage of the vehicle during the period in which the user utilizes the overnight vehicle.

Although the disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A vehicle operation management apparatus that creates an operation plan based on information transmitted from a user terminal operated by a user,
the vehicle operation management apparatus comprising an operation management controller configured to:
receive information including embarking and disembarking position information from the user terminal operated by the user;
select an overnight stay parking lot based on the received information;
create the operation plan including a plan of using at least one of electric power and fuel in accordance with a facility of the overnight stay parking lot;
select an overnight vehicle that can be used in accordance with the operation plan, wherein the overnight vehicle is capable of allowing overnight stay of the user in the vehicle, wherein the user embarks on the overnight vehicle, and wherein the vehicle operation management apparatus manages an operation of the overnight vehicle;
calculate a price corresponding to the operation plan; and
transmit vehicle information of the selected overnight vehicle and price information of the determined price to the user terminal,
wherein
the overnight vehicle includes a rechargeable battery, and
in a case where there is no facility capable of charging the battery and no facility capable of performing fuel supply to the overnight vehicle in the overnight stay parking lot selected in the operation plan, the operation plan is set to an operation plan of suppressing consumption of electric power from the battery in the overnight vehicle.

2. The vehicle operation management apparatus according to claim 1, wherein
the embarking and disembarking position information includes disembarking position information received from the user terminal, and
the operation management controller is configured to determine the operation plan in a manner that the price in a case of performing overnight stay before travel to the disembarking position in the disembarking position information differs from the price in a case of performing overnight stay after travel to the disembarking position.

3. A vehicle operation management apparatus that creates an operation plan based on information transmitted from a user terminal operated by a user,
the vehicle operation management apparatus comprising an operation management controller configured to:
receive information including embarking and disembarking position information from the user terminal operated by the user;

select an overnight stay parking lot based on the received information;

create the operation plan including a plan of using at least one of electric power and fuel in accordance with a facility of the overnight stay parking lot;

select an overnight vehicle that can be used in accordance with the operation plan, wherein the overnight vehicle is capable of allowing overnight stay of the user in the vehicle, wherein the user embarks on the overnight vehicle, and wherein the vehicle operation management apparatus manages an operation of the overnight vehicle;

calculate a price corresponding to the operation plan; and transmit vehicle information of the selected overnight vehicle and price information of the determined price to the user terminal, wherein
   the overnight vehicle includes an engine capable of generating electricity, and
   the operation plan includes a plan of using at least one of electric power or fuel capable of maintaining a state where the engine is not used in a predetermined time zone.

4. The vehicle operation management apparatus according to claim 3, wherein
   the embarking and disembarking position information includes disembarking position information received from the user terminal, and
   the operation management controller is configured to determine the operation plan in a manner that the price in a case of performing overnight stay before travel to the disembarking position in the disembarking position information differs from the price in a case of performing overnight stay after travel to the disembarking position.

* * * * *

UNITED STATES PATENT AND TRADEMARK OFFICE
CERTIFICATE OF CORRECTION

PATENT NO. : 10,514,267 B2
APPLICATION NO. : 16/225170
DATED : December 24, 2019
INVENTOR(S) : Katsuya Terahata et al.

It is certified that error appears in the above-identified patent and that said Letters Patent is hereby corrected as shown below:

In the Specification

In Column 2, Line 7, delete "cars" and insert --can--, therefor.

In Column 2, Line 49, after "supplied", delete "In" and insert --in--, therefor.

In Column 2, Line 52, after "consideration", delete "In" and insert --in--, therefor.

In Column 5, Line 37, after "to", delete "20".

In Column 5, Line 60, before "to", delete "20".

In Column 5, Line 64, delete "Information Items" and insert --information items--, therefor.

In Column 7, Line 17, before "the", delete "20".

In Column 8, Line 13, after "operation", delete ",".

In Column 8, Line 24, delete "Information" and insert --information--, therefor.

In Column 8, Line 61 & 62, delete "searched-for)" and insert --(searched-for)--, therefor.

In Column 10, Line 9, after "searched", delete "In" and insert --in--, therefor.

In Column 10, Line 51, delete "can he" and insert --can be--, therefor.

In Column 11, Line 4, after "plans", delete "In" and insert --in--, therefor.

In Column 11, Line 16, delete "32>" and insert --B2>--, therefor.

Signed and Sealed this
Fourth Day of February, 2020

Andrei Iancu
*Director of the United States Patent and Trademark Office*

In Column 11, Line 32, after "which", delete ",".

In Column 11, Line 40, after "from", delete ",".

In Column 12, Line 35, delete "step. ST12" and insert --step ST12--, therefor.

In Column 13, Line 45, delete "sons" and insert --zone--, therefor.

In Column 13, Line 67, delete "electric: power" and insert --electric power--, therefor.